United States Patent Office 2,701,135
Patented Feb. 1, 1955

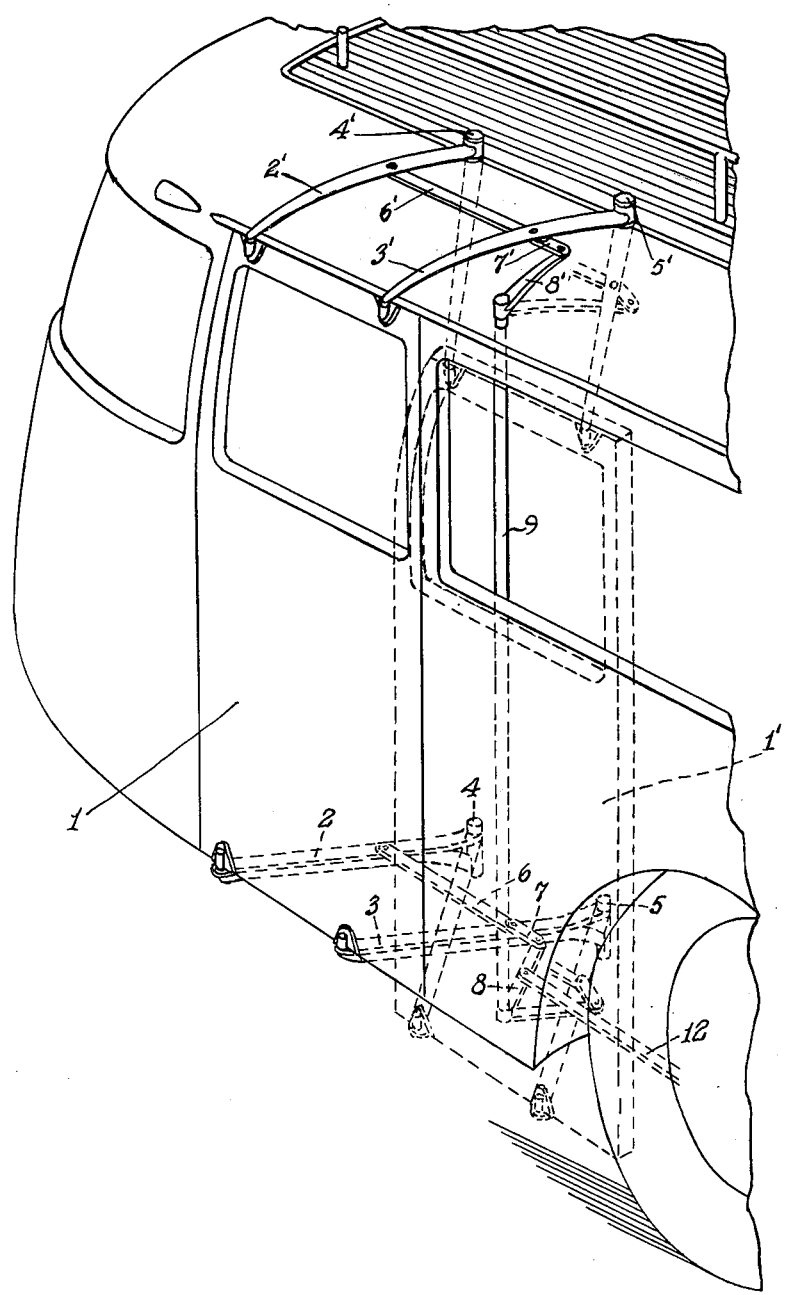

2,701,135

DEVICE FOR OPENING AND CLOSING THE DOORS OF PASSENGER VEHICLES

Arturo Balestrieri, Parma, Italy

Application October 24, 1951, Serial No. 252,863

Claims priority, application Italy October 27, 1950

3 Claims. (Cl. 268—46)

This invention relates to a device for slidably opening and closing the door of a motor vehicle.

Conventional systems for opening and closing the doors of motor vehicles such as street cars, motor coaches, trolley buses and the like have well-known drawbacks and disadvantages. If the door is hinged on one side only to an upright shaft, when the door is opened it partially blocks the doorway. Moreover, the closing of such a door requires considerable power and the door closes with such force that passengers who may inadvertently be in the path of the closing door may be injured.

In the case of folding doors which are commonly used, tight closing of the door opening is difficult to achieve with the result that the interior of the vehicle is exposed to drafts and dust. Furthermore, the mounting of folding doors on an existing vehicle is impossible from a practical standpoint because of the need for completely reconstructing the door opening to accommodate properly the new door.

It is the object of the present invention to provide a door opening and closing construction which avoids the disadvantages of prior constructions, which may be readily and properly employed in existing vehicles, and which permits complete exposure of the door opening and at the same time provides a tight closing of the opening without danger of injury to passengers who may be standing near it.

In accordance with the invention, the door is held at its lower portion by one or two arms which are connected by a rod and are arranged to pivot around an upright shaft. The upper portion of the door is held by one or two arms, which, like the lower arms, are connected by a rod. The upper and lower arm assemblies are connected for synchronized movement by means of a vertical shaft which interconnects the two assemblies.

Control of the opening and closing of the door is effected by means of a lever linkage accessible to the driver of the vehicle, or by means of any convenient pneumatic or electrical means. When the vehicle has both front and rear doors, the movements of the doors may be simultaneous or in staggered relationship, as desired.

The door opening and closing assembly of the invention may also include, if desired, means for issuing a warning signal when the doors are in motion and means comprising visual or acoustical signals for informing the driver of the open or closed condition of the doors.

There is shown in the single figure of the accompanying drawing a perspective view of a vehicle door opening and closing construction embodying features of the present invention, the embodiment shown in the drawing being merely illustrative and not limitative of the invention.

Referring to the drawing, the door 1 is carried by lower levers 2 and 3 which are pivotally connected at their ends to shafts 4 and 5, respectively. Levers 2 and 3 are interconnected by a rod 6 which causes the levers to move simultaneously and over equal distances. Rod 6 is connected to a smaller rod 7 which is pivoted to a lever 8 which in turn is rigidly connected with an upright shaft 9. Operation of the mechanism is controlled by a rod 12 which is connected to lever 8 and is adapted to be actuated either by the driver directly or by any suitable mechanical means under the driver's control. Upper levers 2' and 3' are pivotally connected to the upper end of door 1, the upper lever assembly including shafts 4' and 5', rod 6', rod 7' and lever 8' corresponding to parts 4, 5, 6, 7 and 8, respectively. Lever 8' is rigidly connected to upright shaft 9 and rotation of shaft 9 upon movement of lever 8 causes an equivalent movement of lever 8' and the associated parts of the upper lever assembly.

Movements of lever 8 under the influence of rod 12, therefore, cause the door to travel along the side of the vehicle, while keeping itself parallel to its original position, movement being along an arc having its center determined by shafts 4, 4', 5, 5'.

The maximum displacement of the levers corresponds to the open position of the door, as indicated at 1', which lies against the vehicle body while leaving free the opening normally closed by it.

In this manner there are realized the advantages of having the door wholly free of the opening and being displaced away from the vehicle body while opening and closing only by a few centimeters.

Since various changes and modifications may be made in the embodiment of the invention above described and shown in the drawing without departing from the scope thereof as defined in the appended claims, it is intended that all matter contained in the foregoing description and in the drawing shall be interpreted as illustrative only and not in a limiting sense.

What I claim is:

1. A device for slidably opening and closing the doors of a motor vehicle by displacing said doors laterally closely adjacent the adjacent portions of the vehicle comprising, in combination, a vertical rotatable shaft, a top lever assembly, and a bottom lever assembly each including a pair of parallel spaced-apart first lever arms pivoted at one end to the door and at the other end to the vehicle body substantially inwardly of the door, a link interconnecting the arms of each pair and pivoted to said arms, a second arm rigidly secured at one end to said shaft, and a third arm pivotally connected to the other end of the second arm and to said first lever arms, said shaft thereby interconnecting said top lever assembly and said bottom lever assembly, and means adapted to be operated by the driver of the vehicle pivotally connected to the second arm of a lever assembly for rotating said shaft and thereby shifting said pairs of first lever arms to slide said door laterally over the adjacent portions of the vehicle.

2. A device for slidably opening and closing the doors of a motor vehicle by displacing said doors laterally closely adjacent the adjacent portions of the vehicle comprising, in combination, a vertical rotatable shaft, a top lever assembly, and a bottom lever assembly parallel thereto, said top and said bottom assembly including a pair of parallel spaced-apart first lever arms pivoted at one end respectively to the top and bottom of the door and at the other end to the vehicle body substantially inwardly of the door, a link interconnecting the arms of each pair and pivoted to said arms to form an articulated parallelogram therewith, second arms rigidly secured at one end to each end of said shaft, and third arms pivotally connected to the other end of the second arms and to said first lever arms, said shaft thereby interconnecting said top lever assembly and said bottom lever assembly, and means adapted to be operated by the driver of the vehicle pivotally connected to the second arm of said bottom lever assembly for rotating said shaft and thereby shifting said pairs of first lever arms to slide said door laterally over the adjacent portions of the vehicle.

3. A device for slidably opening and closing the door of a motor vehicle by displacing said door laterally closely adjacent the adjacent portions of the vehicle comprising, in combination, a vertical rotatable shaft, a top lever assembly and a bottom lever assembly, each of said lever assemblies including two parallel lever arms, each of the lever arms being pivoted at one end to the door and at its other end to the vehicle body, whereby to form an articulated parallelogram having a fixed side defined by the portion of the vehicle body comprised between the points of attachment of said parallel lever arms to the vehicle body, each lever assembly further comprising a lever connecting said vertical shaft to one of said parallel lever arms, said shaft thereby being connected to said top lever assembly and to said bottom lever assembly, and means adapted to be operated by the driver of the vehicle connected to effect rotation of said shaft and thereby shifting said pairs of lever arms to slide said doors laterally over the adjacent portions of the vehicle.

References Cited in the file of this patent

UNITED STATES PATENTS

| | | |
|---|---|---|
| 1,009,488 | Dombrink | Nov. 21, 1911 |
| 1,491,781 | Axen | Apr. 29, 1924 |
| 1,967,346 | Barnby | July 24, 1934 |
| 2,108,224 | Haseltine | Feb. 15, 1938 |
| 2,161,323 | Stephenson | June 6, 1939 |
| 2,204,753 | Dwyer | June 18, 1940 |
| 2,453,793 | Hveem | Nov. 16, 1948 |

FOREIGN PATENTS

| | | |
|---|---|---|
| 394,318 | Great Britain | June 9, 1933 |
| 444,130 | Great Britain | Mar. 16, 1936 |